(12) United States Patent
Chalmers et al.

(10) Patent No.: US 12,288,219 B1
(45) Date of Patent: Apr. 29, 2025

(54) SYSTEM AND METHOD FOR IMPROVED PHONE AND DIGITAL COMMUNICATION VERIFICATION AND EFFICIENCY

(71) Applicant: United Services Automobile Association (USAA), San Antonio, TX (US)

(72) Inventors: Timothy Blair Chalmers, San Antonio, TX (US); Ramsey Devereaux, San Antonio, TX (US); Dwayne Phillip Wilson, Crossroads, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 228 days.

(21) Appl. No.: 17/496,576

(22) Filed: Oct. 7, 2021

Related U.S. Application Data

(60) Provisional application No. 63/089,369, filed on Oct. 8, 2020.

(51) Int. Cl.
*G06Q 30/016* (2023.01)
*G06Q 30/02* (2023.01)
*H04L 9/40* (2022.01)

(52) U.S. Cl.
CPC ....... *G06Q 30/016* (2013.01); *G06Q 30/0281* (2013.01); *H04L 63/08* (2013.01); *H04L 63/105* (2013.01)

(58) Field of Classification Search
CPC .. G06Q 30/016; G06Q 30/0281; H04L 63/08; H04L 63/105
See application file for complete search history.

(56) References Cited

U.S. PATENT DOCUMENTS

| | | | | |
|---|---|---|---|---|
| 6,257,896 B1 * | 7/2001 | Fargano | ............... | G09B 7/02 340/286.02 |
| 6,829,348 B1 * | 12/2004 | Schroeder | ............... | G06Q 30/02 379/265.09 |
| 7,024,423 B1 * | 4/2006 | Aboujaoude | ............... | G06Q 30/06 707/951 |
| 7,536,543 B1 * | 5/2009 | Sandhu | ............... | H04L 63/08 713/168 |

(Continued)

*Primary Examiner* — Aravind K Moorthy
(74) *Attorney, Agent, or Firm* — FLETCHER YODER PC

(57) ABSTRACT

A computer-implemented method includes receiving, via processing circuitry and from a customer interface device (CID), a customer communication and first authentication data, searching, via the processing circuitry, a database for a customer account corresponding to the customer communication, receiving, at the processing circuitry and from the database, first registered data corresponding to the customer account, and determining, via the processing circuitry, a first security challenge having a first security level category of a plurality of security level categories. The computer-implemented method also includes determining, via the processing circuitry and based on a first comparison between the first authentication data and the first registered data, a first outcome of the first security challenge, and determining, via the processing circuitry, for a second security challenge, and based on the first outcome of the first security challenge, a second security level category of the plurality of security level categories, the second security level category differing from the first security level category.

17 Claims, 4 Drawing Sheets

(56) References Cited

U.S. PATENT DOCUMENTS

| | | | | |
|---|---|---|---|---|
| 8,112,483 B1* | 2/2012 | Emigh | G06F 21/36 | 713/182 |
| 8,478,278 B1* | 7/2013 | Scott | H04W 4/021 | 455/445 |
| 8,667,072 B1* | 3/2014 | Cordell | G06Q 30/01 | 709/206 |
| 8,745,390 B1* | 6/2014 | Atwood | H04L 9/0825 | 713/169 |
| 8,904,493 B1* | 12/2014 | Dibble | H04L 63/08 | 726/4 |
| 9,185,095 B1* | 11/2015 | Moritz | H04L 63/0861 | |
| 9,191,381 B1* | 11/2015 | Popp | H04L 63/0823 | |
| 9,264,667 B1* | 2/2016 | Mande | H04N 7/15 | |
| 9,418,567 B1* | 8/2016 | Chen | G09B 7/06 | |
| 9,436,820 B1* | 9/2016 | Gleichauf | H04L 63/02 | |
| 9,485,237 B1* | 11/2016 | Johansson | H04L 9/3271 | |
| 9,662,565 B1* | 5/2017 | Riordan | A63F 13/80 | |
| 9,830,587 B1* | 11/2017 | Bell | G06Q 20/322 | |
| 9,832,316 B1* | 11/2017 | Prasad | H04M 3/5235 | |
| 9,942,214 B1* | 4/2018 | Burciu | H04L 63/08 | |
| 10,380,515 B1* | 8/2019 | Chamness | G06Q 10/063112 | |
| 10,447,677 B1* | 10/2019 | Jamison | G06F 21/32 | |
| 10,470,043 B1* | 11/2019 | Cherala | H04W 12/12 | |
| 10,733,594 B1* | 8/2020 | Dai Zovi | H04L 63/1425 | |
| 10,832,593 B1* | 11/2020 | Dahl | G09B 19/167 | |
| 10,839,066 B1* | 11/2020 | Pham | G06F 21/40 | |
| 10,911,425 B1* | 2/2021 | Hitchcock | G06F 21/34 | |
| 10,972,458 B1* | 4/2021 | Gaeta | G06F 21/32 | |
| 11,211,140 B1* | 12/2021 | Satpathy | G06F 21/31 | |
| 11,271,930 B2* | 3/2022 | Piel | G06Q 20/40 | |
| 11,288,673 B1* | 3/2022 | Venturelli | G06F 18/214 | |
| 11,374,968 B1* | 6/2022 | Colón | H04L 63/1466 | |
| 11,593,465 B2* | 2/2023 | Inoue | G06F 21/32 | |
| 11,816,672 B1* | 11/2023 | Singh | G06Q 20/382 | |
| 11,824,858 B1* | 11/2023 | McKinless | H04L 63/102 | |
| 2002/0085704 A1* | 7/2002 | Shires | H04M 3/5191 | 379/209.01 |
| 2002/0111999 A1* | 8/2002 | Andersson | G06F 9/542 | 709/217 |
| 2002/0112185 A1* | 8/2002 | Hodges | H04L 63/105 | 709/224 |
| 2003/0041240 A1* | 2/2003 | Roskind | H04L 63/0815 | 713/168 |
| 2004/0143750 A1* | 7/2004 | Kulack | G06F 21/577 | 726/25 |
| 2005/0138430 A1* | 6/2005 | Landsman | H04L 63/101 | 726/4 |
| 2005/0166049 A1* | 7/2005 | Touitou | H04L 63/1466 | 713/170 |
| 2006/0015725 A1* | 1/2006 | Voice | H04L 9/3273 | 713/168 |
| 2006/0156385 A1* | 7/2006 | Chiviendacz | H04L 9/3271 | 726/2 |
| 2007/0288572 A1* | 12/2007 | Busa | G06F 11/0748 | 709/205 |
| 2008/0083017 A1* | 4/2008 | Lulich | G06F 21/41 | 726/4 |
| 2009/0083618 A1* | 3/2009 | Campbell | G06F 40/174 | 715/226 |
| 2010/0166171 A1* | 7/2010 | Velusamy | H04M 3/5175 | 379/265.11 |
| 2010/0228804 A1* | 9/2010 | Dasgupta | G06F 16/951 | 726/19 |
| 2010/0229223 A1* | 9/2010 | Shepard | H04L 63/083 | 726/5 |
| 2010/0299716 A1* | 11/2010 | Rouskov | H04L 63/105 | 726/1 |
| 2010/0313121 A1* | 12/2010 | Hinds | G06Q 10/10 | 715/810 |
| 2011/0029781 A1* | 2/2011 | Clark | H04L 63/08 | 713/182 |
| 2011/0072507 A1* | 3/2011 | Johnston, II | H04L 63/0853 | 726/12 |
| 2011/0137809 A1* | 6/2011 | Klapheke | G06Q 10/00 | 705/304 |
| 2011/0197266 A1* | 8/2011 | Chu | H04L 9/3228 | 726/5 |
| 2012/0090028 A1* | 4/2012 | Lapsley | H04L 63/1416 | 704/E21.001 |
| 2012/0242459 A1* | 9/2012 | Lambert | H04L 9/3271 | 340/10.3 |
| 2012/0246008 A1* | 9/2012 | Hamilton, II | G06Q 30/0241 | 705/14.66 |
| 2012/0254946 A1* | 10/2012 | Fleischman | H04L 63/0823 | 726/19 |
| 2012/0290332 A1* | 11/2012 | Bradshaw | G06Q 40/08 | 705/26.1 |
| 2012/0304260 A1* | 11/2012 | Steeves | H04L 63/083 | 726/5 |
| 2013/0006789 A1* | 1/2013 | Fulkerson | G06Q 10/00 | 705/26.1 |
| 2013/0018796 A1* | 1/2013 | Kolhatkar | G06Q 20/405 | 705/44 |
| 2013/0160098 A1* | 6/2013 | Carlson | G06F 21/31 | 726/6 |
| 2013/0198039 A1* | 8/2013 | Sridharan | G06Q 30/0613 | 705/26.44 |
| 2013/0198861 A1* | 8/2013 | Kishi | G06F 21/445 | 726/28 |
| 2013/0203439 A1* | 8/2013 | Lifshitz | G06Q 50/01 | 455/456.2 |
| 2013/0232543 A1* | 9/2013 | Cheng | H04L 63/20 | 726/1 |
| 2013/0311245 A1* | 11/2013 | Blackburn | G06Q 10/06393 | 705/7.39 |
| 2014/0066176 A1* | 3/2014 | LeTourneau | A63F 13/335 | 463/23 |
| 2014/0115670 A1* | 4/2014 | Barton | G06F 21/36 | 726/4 |
| 2014/0117073 A1* | 5/2014 | Bell | H04L 12/1818 | 235/375 |
| 2014/0189791 A1* | 7/2014 | Lindemann | H04L 63/20 | 726/3 |
| 2014/0207614 A1* | 7/2014 | Ramaswamy | G06Q 30/0613 | 705/26.41 |
| 2014/0244437 A1* | 8/2014 | Longino | G06Q 30/0613 | 705/26.41 |
| 2014/0259130 A1* | 9/2014 | Li | G06F 21/31 | 726/6 |
| 2014/0365334 A1* | 12/2014 | Hurewitz | G06Q 30/0613 | 705/26.41 |
| 2015/0025929 A1* | 1/2015 | Abboud | G06Q 30/0613 | 705/7.15 |
| 2015/0026796 A1* | 1/2015 | Alan | G06F 21/31 | 726/19 |
| 2015/0052587 A1* | 2/2015 | O'Neill | H04W 12/06 | 726/4 |
| 2015/0128236 A1* | 5/2015 | Moscicki | G06F 21/31 | 726/7 |
| 2015/0310444 A1* | 10/2015 | Chen | G06Q 20/308 | 705/44 |
| 2015/0334098 A1* | 11/2015 | Keys | H04L 63/0861 | 726/9 |
| 2015/0334099 A1* | 11/2015 | Zhang | H04L 63/0861 | 726/6 |
| 2015/0381602 A1* | 12/2015 | Grim | H04W 12/30 | 726/4 |
| 2015/0382195 A1* | 12/2015 | Grim | H04W 12/06 | 726/4 |
| 2016/0012384 A1* | 1/2016 | Hanson | G06Q 10/063118 | 705/7.17 |
| 2016/0014553 A1* | 1/2016 | Cardinal | H04W 4/029 | 455/456.3 |
| 2016/0029157 A1* | 1/2016 | Egan | H04W 4/029 | 455/456.2 |
| 2016/0048893 A1* | 2/2016 | Thanuvan | H04L 63/08 | 705/26.35 |
| 2016/0080355 A1* | 3/2016 | Greenspan | H04L 63/08 | 726/7 |

(56) References Cited

U.S. PATENT DOCUMENTS

| | | | | |
|---|---|---|---|---|
| 2016/0094551 A1* | 3/2016 | Sugihara | H04L 9/14 | 726/7 |
| 2016/0171577 A1* | 6/2016 | Robinson, Jr. | H04W 4/33 | 705/7.13 |
| 2016/0255063 A1* | 9/2016 | Zhang | G06F 11/079 | 713/168 |
| 2017/0053280 A1* | 2/2017 | Lishok | G06Q 20/3224 | |
| 2017/0116608 A1* | 4/2017 | Forzley | G06Q 20/4014 | |
| 2017/0118223 A1* | 4/2017 | Mathew | G06F 21/31 | |
| 2017/0180384 A1* | 6/2017 | Malenfant | H04L 63/12 | |
| 2017/0195307 A1* | 7/2017 | Jones-McFadden | H04W 12/06 | |
| 2017/0244709 A1* | 8/2017 | Jhingran | G06F 21/44 | |
| 2017/0330191 A1* | 11/2017 | Pender | G06Q 20/3221 | |
| 2017/0331824 A1* | 11/2017 | Pender | H04L 63/0892 | |
| 2017/0345000 A1* | 11/2017 | Kohli | G06Q 30/0233 | |
| 2017/0364871 A1* | 12/2017 | Kurian | H04L 63/105 | |
| 2017/0366564 A1* | 12/2017 | Ping | H04L 63/20 | |
| 2017/0374197 A1* | 12/2017 | Rumpf | H04M 3/5125 | |
| 2018/0007060 A1* | 1/2018 | Leblang | H04L 63/107 | |
| 2018/0027029 A1* | 1/2018 | Linder | G06Q 30/016 | 709/204 |
| 2018/0034859 A1* | 2/2018 | Aronowitz | H04L 63/08 | |
| 2018/0114001 A1* | 4/2018 | Jain | H04L 63/083 | |
| 2018/0139606 A1* | 5/2018 | Green | H04W 12/06 | |
| 2018/0165722 A1* | 6/2018 | Mirabito, Jr. | G06Q 30/0281 | |
| 2018/0349920 A1* | 12/2018 | Katib | G06Q 30/0185 | |
| 2019/0019197 A1* | 1/2019 | Roberts | G06Q 10/067 | |
| 2019/0020659 A1* | 1/2019 | Loni | H04L 63/105 | |
| 2019/0043326 A1* | 2/2019 | Madden | H04N 7/185 | |
| 2019/0109945 A1* | 4/2019 | Saini | H04M 3/5235 | |
| 2019/0114342 A1* | 4/2019 | Orun | G06F 16/215 | |
| 2019/0114354 A1* | 4/2019 | Orun | G06F 16/24578 | |
| 2019/0279276 A1* | 9/2019 | Leano | G06Q 30/0633 | |
| 2020/0112556 A1* | 4/2020 | Steeves | H04L 63/08 | |
| 2020/0179795 A1* | 6/2020 | Patterson | A63F 9/24 | |
| 2020/0258045 A1* | 8/2020 | Knupfer | G06Q 10/1053 | |
| 2020/0304310 A1* | 9/2020 | Rule | H04L 9/0897 | |
| 2020/0311250 A1* | 10/2020 | Sandstrom | G06F 21/36 | |
| 2020/0327560 A1* | 10/2020 | Anderson | G06F 16/9535 | |
| 2021/0110015 A1* | 4/2021 | McCarty | G06F 21/32 | |
| 2021/0192027 A1* | 6/2021 | Malton | H04W 12/06 | |
| 2021/0217005 A1* | 7/2021 | Mehrhoff | G06Q 20/4014 | |
| 2021/0306344 A1* | 9/2021 | Han | H04L 63/08 | |
| 2021/0312510 A1* | 10/2021 | Serna | G06Q 50/01 | |
| 2021/0326940 A1* | 10/2021 | Serna | G06Q 30/016 | |
| 2021/0409398 A1* | 12/2021 | Benkreira | G06N 7/02 | |
| 2022/0277254 A1* | 9/2022 | Feeney | G08B 21/02 | |
| 2023/0179434 A1* | 6/2023 | Ganji | H04L 9/3271 | 326/8 |
| 2023/0222167 A1* | 7/2023 | Kojima | G06F 16/9536 | 705/319 |

* cited by examiner

SYSTEM AND METHOD FOR IMPROVED PHONE AND DIGITAL COMMUNICATION VERIFICATION AND EFFICIENCY

CROSS-REFERENCE TO RELATED APPLICATIONS

This application claims priority to and the benefit of U.S. Provisional Patent Application No. 63/089,369, entitled "SYSTEM AND METHOD FOR IMPROVED PHONE AND DIGITAL COMMUNICATION VERIFICATION AND EFFICIENCY," filed Oct. 8, 2020, which is hereby incorporated by reference for all purposes.

BACKGROUND

The present disclosure relates generally to systems and methods that improve phone and digital communication between two parties, such as a business and a customer of the business. More particularly, the present disclosure relates to authentication, form completion, and escalation of phone and digital communications between a business and a customer.

Call-based and data-based communications between businesses and customers have increased in importance as businesses have grown in size over time. In particular, customer communications requesting customer service have become more prevalent and important over time. Further, businesses have stored more and more data relating to customers for various purposes, including improving services and products purchased by the customer, improving marketing of services and products to the customer, and other purposes. Because the data stored by various businesses may be private or confidential, businesses have implemented authentication techniques before communicating sensitive information to customers in response to a customer request. Further, because customer service is an important aspect of business and customer relations, businesses have implemented customer-friendly communication systems intended to inform customers regarding various customer requests. It is now recognized that traditional authentication and communication techniques can be expensive, can be slow, and can inefficiently handle customer requests, thereby increasing call-wait times. Improved authentication and communication techniques are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory, computer readable media includes instructions stored thereon that, when executed by processing circuitry, are configured to cause the processing circuitry to perform various tasks. For example, the instructions are configured to cause the processing circuitry to receive, from a customer interface device (CID) of a customer, a customer communication having first authentication data, receive, from a database, first registered data stored to a customer account corresponding to the customer, determine, based on a first comparison between the first authentication data and the first registered data, a first outcome of a first security challenge, and determine, from a plurality of security level categories, a first security level category associated with the first security challenge. The instructions are also configured to cause the processing circuitry to determine, from the plurality of security level categories, based on the first security level category associated with the first security challenge, and based on the first outcome of the first security challenge, a second security level category associated with a second security challenge, the second security level category differing from the first security level category.

In one embodiment, a system includes a database storing customer account data indicative of a plurality of customer accounts, and processing circuitry. The processing circuitry is configured to receive, from a customer interface device (CID), a customer communication and first authentication data, determine, based on the customer communication, a customer account of the plurality of customer accounts, receive, from the database, first registered data corresponding to the customer account, determine, based on a first comparison between the first authentication data and the first registered data, a first outcome of a first security challenge, and determine, from a plurality of security level categories, a first security level category associated with the first security challenge. The processing circuitry is also configured to determine, for a second security challenge and based on the first security level category, the first outcome of the first security challenge, or both, a second security level category of the plurality of security level categories, the second security level category differing from the first security level category. The processing circuitry is also configured to receive, from the database, second registered data corresponding to the customer account and the second security challenge, receive, from the CID, second authentication data, and determine, based on a second comparison between the second registered data and the second authentication data, a second outcome of the second security challenge.

In one embodiment, a computer-implemented method includes receiving, via processing circuitry and from a customer interface device (CID), a customer communication and first authentication data, searching, via the processing circuitry, a database for a customer account corresponding to the customer communication, receiving, at the processing circuitry and from the database, first registered data corresponding to the customer account, and determining, via the processing circuitry, a first security challenge having a first security level category of a plurality of security level categories. The computer-implemented method also includes determining, via the processing circuitry and based on a first comparison between the first authentication data and the first registered data, a first outcome of the first security challenge, and determining, via the processing circuitry, for a second security challenge, and based on the first outcome of the first security challenge, a second security level category of the plurality of security level categories, the second security level category differing from the first security level category.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
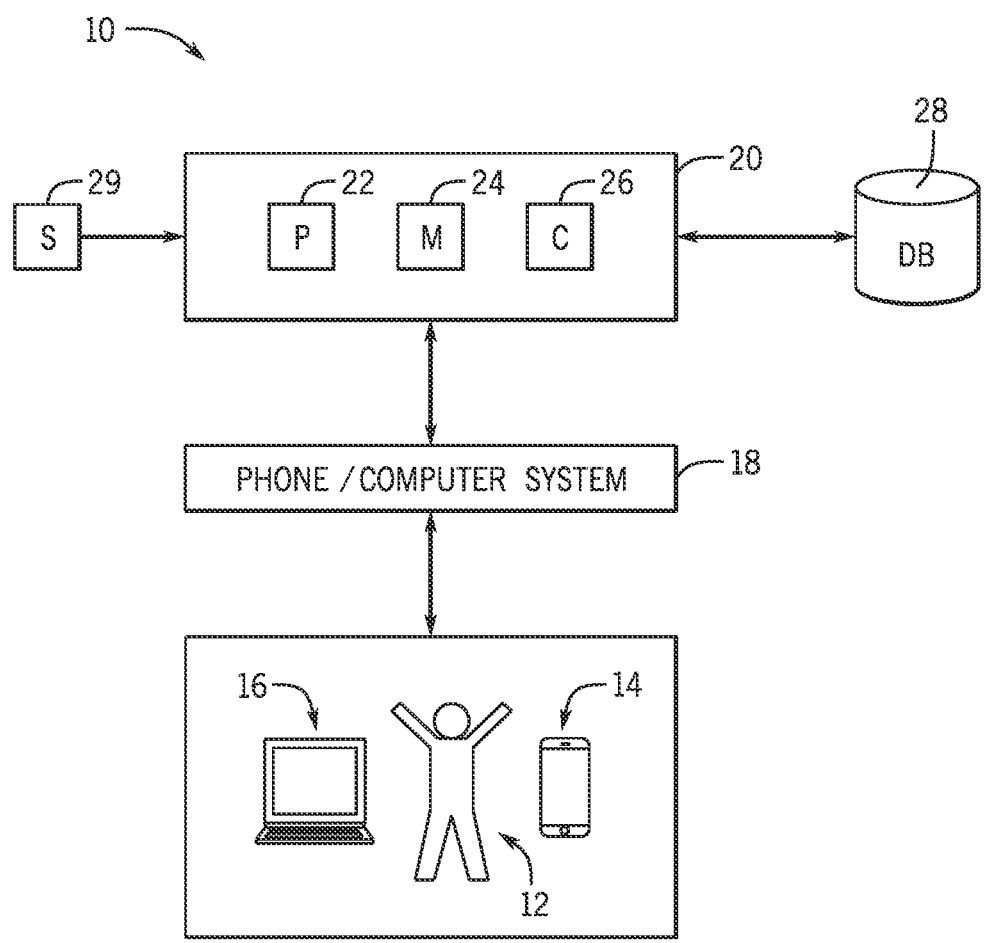
FIG. 1 illustrates a communication system, such as a customer service communication system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to systems and methods that improve phone and digital communication between two parties, such as a business and a customer of the business. More particularly, the present disclosure relates to authentication, form completion, and escalation of phone and digital communications between a business and a customer.

The presently disclosed communication system may include a phone/computer system configured to receive customer communications, a server communicatively coupled with the phone/computer system and having a processor, server, and communication circuitry, and a database communicatively accessible by the server. The server is configured to determine various security challenges used to authenticate or verify the customer communication and a customer sending the customer communication. The security challenges (and data required to meet the security challenges) may be categorized by, for example, credibility. The types of security challenges presented to the customer may differ based on various factors. For example, the server may present a security challenge corresponding to a highest level of security (e.g., most credible) in response to the customer failing an earlier security challenge. Additionally or alternatively, the customer may be required to pass multiple security challenges. A security level of, for example, a second security challenge may depend on the security level of a first security challenge previously passed by the customer. Other control decisions for determining a security level of various security challenges are also possible and will be described in detail with reference to the drawings. In general, the disclosed systems and methods enable improved customer service efficiency and effectiveness, thereby reducing call times and customer frustration compared to traditional embodiments. Challenges may be assigned predetermined or preprogrammed security levels (e.g., based on developer decisions and analysis). However, security levels for challenges may also be dynamically assigned based on on-going machine learning, data accumulation, artificial or augmented intelligence algorithms, and the like. For example, challenges and responses may be monitored via a learning algorithm and results may be used to define security levels based on the results.

The disclosed system may also include form filling techniques for filling a form indicative of the customer communication (or a request corresponding to the customer communication) based on preliminary information received with the initial customer communication and/or provided in an early stage of assisting the customer. For example, the customer communication may include a request for assistance regarding a particular topic, such as home owner's insurance or utilities. The system may automatically fill a form related to the request, where the form includes data provided in the customer communication and, in some embodiments, additional data. For example, if assistance regarding home owner's insurance is requested, the system may determine, based on information stored to a customer account, that the home in question has a particular square footage, and the square footage may be included in the form. If assistance regarding utilities is requested, the system may determine, based on information stored to a customer account and/or other data, that a water leak has been detected in the customer's home. For example, the system may include data feedback from a sensor (e.g., leak sensor) that detects the leak. Other customer requests and form filling are also possible.

Further to the points set forth above, the disclosed system may employ a communication cross-over technique for transitioning assistance of a customer between various forms of communication, dependent on aspects of the initial customer communication and other factors. In some embodiments, the communication cross-over technique may involve receiving a customer communication via text, email, or web chat, and determining that a phone call is more desirable or a combination of text-based and phone communication is desirable. Data received from the initial customer communication, and from additional sources based on the initial customer communication, may be added to a form. A link and/or access code enabling access to the form, or the form itself, may be sent to the customer and/or a customer service representative handling the phone call. By filling the form prior to or during the communication cross-over, and by making the form available to the customer and the customer service representative, the system enables reduced call times, improved customer assistance, and redundancy in the event one form of communication fails. After conclusion of customer assistance, the system may provide recommendations to the customer and/or the customer service representative regarding improved communication options for future requests. These and other aspects of the present disclosure will be described in detail below with reference to the drawings.

Turning now to the drawings, FIG. 1 illustrates an embodiment of a communication system 10, such as a customer service communication system, operated by a business. The illustrated communication system 10 includes a phone and/or computer system 18 of the business, which is configured to receive a communication from a customer 12. For example, the phone and/or computer system 18 may receive a communication from a cell phone 14 operated by the customer 12, a laptop 16 operated by the customer 12, or some other customer interface device (CID). The communication may include a phone call, a digital or data communication (e.g., an email or other computer-based communication), or a combination thereof.

The communication system 10 also includes a server 20 having a processor 22, a memory 24, and communication circuitry 26. The memory 24 includes instructions stored thereon that, when executed by the processor 22, causes the processor 22 to perform various acts described in detail below. The processor 22 may represent multiple processors and the memory 24 may represent multiple memories (e.g., tangible, computer-readable media). In the illustrated embodiment, the server 20 is separate from the phone and/or computer system 18 and configured to communicate with the phone and/or computer system 18 (e.g., via the communication circuitry 26, which may enable wired or wireless communication between the server 20 and the phone and/or computer system 18). In another embodiment, the server 20 may be integral with the phone and/or computer system 18.

The communication system 10 also includes a database 28 and a sensor 29. The database 28 may include customer accounts and other data stored thereon. Each customer account may be populated with data relating to the corresponding customers. For example, the database 28 may include a customer account corresponding to the customer 12, in addition to a number of other customer accounts corresponding to other customers. In some embodiments, each customer account may include customer-specific data related to authentication. For example, the customer account of the customer 12 may include data specific to the customer 12 and usable in an authentication technique. In one embodiment, the customer account may include data corresponding to a number of different security level categories. For example, certain authentication (e.g., an authenticated phone number or social security number) may be more credible than certain other authentication data (e.g., an authenticated name). Thus, different security challenges corresponding to different security level categories may be selectively provided based on security challenge outcomes and/or other features described in detail below. The sensor 29 may also be utilized by the system 10 to facilitate assisting the customer 12. The sensor 29 and corresponding features will be described in detail with respect to FIGS. 3 and 4.

Continuing with FIG. 1, in order to improve authentication accuracy and efficiency, a multi-level authentication approach may be employed by the communication system 10. For example, after the phone and/or computer system 18 receives the customer communication corresponding to a customer request, the phone and/or computer system 18 may communicate data indicative of the customer communication to the server 20. The data indicative of the customer communication may include information such as, but not limited to, a phone number corresponding to the customer communication, an IP address corresponding to the customer communication, a location corresponding to the customer communication, and others. Certain of this information may be obtained without querying the customer 12 (e.g., prompting the customer for input via the phone 14, laptop 16, or other CID). For example, the phone number, IP address, and/or location corresponding to the customer communication may be automatically obtained without querying the customer. Certain other information included in the data indicative of the customer communication may be provided (e.g., input and transmitted via the phone 14, laptop 16, or some other CID) by the customer 12 in response to a query. For example, the customer communication may include data provided by the customer 12 and indicative of identifying information of the customer 12, such as a name of the customer 12, a birthdate of the customer 12, a social security number of the customer 12, or an account number of the customer 12.

The server 20 may access the customer account corresponding to the customer 12 and stored to the database 28. The server 20 may determine whether the data indicative of the customer communication passes a first security challenge by comparing the data indicative of the customer communication with the data stored to the customer account. As described in detail below, another security challenge may be presented based on the outcome of the first security challenge.

In a first outcome of the first security challenge, the data indicative of the customer communication may fail the first security challenge. As previously noted, different security challenges may be arranged in an order of credibility. A highest security level category may correspond to the most credible security challenge for authentication, whereas a lowest security level category may correspond to the least credible security challenge for authentication. Additionally or alternatively, a highest security level category may correspond to a most inconvenient data type, whereas a lowest security level category may correspond to a most convenient data type. That is, the data types associated with the highest security level category may include relatively obscure information, whereas the data types associated with the lowest security level category may correspond to relatively conspicuous information. In one example, any information that can be or is gleaned without customer feedback (e.g., customer's phone number, IP address, location) is most convenient for testing. Testing said information that can be or is gleaned without customer feedback may be more convenient than testing a customer's name, testing the customer's name may be more convenient than testing the customer's birthday, testing the customer's birthday may be more convenient than testing the customer's familial history, and testing the customer's familial history may be more convenient than testing the customer's password, PIN number, social security number, or driver's license number.

In one embodiment, if the first security challenge fails, the server 20 may require that a security challenge corresponding to the highest security level category be passed to authenticate the customer 12 and corresponding customer communication. For example, in the first security challenge, the server 20 may compare a phone number corresponding to the cell phone 14 from which the customer communication is received to an actual phone number of the customer 12 stored to the customer account in the database 28. If the phone number corresponding to the cell phone 14 does not match the phone number of the customer 12 stored to the customer account in the database 28, then the server 20 may require a security challenge corresponding to the highest security level category, such as requiring that the customer 12 verify the social security number of the customer 12, the account number of the customer 12, a PIN (personal identification number) or password corresponding to the account number, or any combination thereof. If the customer 12 is able to provide the correct social security number and the correct account number (e.g., matching those stored in the customer account on the database 28), then the server 20 may authenticate the customer 12 and the customer communication thereof, authorizing additional communication between the customer 12 and an automated or human customer service representative (e.g., via the phone/computer system 18).

In a second outcome of the first security challenge, the data indicative of the customer communication may pass the first security challenge. If the data indicative of the customer communication passing the first security challenge is of a type corresponding to a relatively high security level category (e.g., higher than a threshold security level category), then the customer 12 or the customer communication thereof may be authenticated. If the data indicative of the customer communication passing the first security challenge is of a type corresponding to a relatively low security level category (e.g., lower than the threshold security level category), then the server 20 may determine that a second security challenge is required. However, if the first security challenge is passed and a second security challenge is required, the second security challenge may include a security level category less than the highest security level category. For example, the server 20 may determine, based on the security level category corresponding to the data indicative of the customer communication passing the first security challenge, that only an intermediate security level category is needed for the second security challenge.

If the customer 12 is unable to pass the second security challenge corresponding to the intermediate security level category, then the server 20 may require a third security challenge having the next highest security level category above the intermediate security level category. For example, in one embodiment, the security level categories may include a first level corresponding to a lowest security level category (e.g., least credible), a fifth level corresponding to a highest security level category (e.g., most credible), and second, third, and fourth levels between the first and fifth levels. If the second security challenge corresponds to the third level and the customer 12 is unable to pass the second security challenge, the server 20 may require a third security challenge corresponding to the fourth level (i.e., the next highest level).

Categorizing the security challenges and corresponding data may depend on the type of information being protected for the customer 12, the goals of the business and/or the customer 12, and other factors. In one embodiment, the lowest security level category may relate to data such as a name of the customer 12, or a phone number, IP (Internet protocol) address, or location of the device (e.g., phone 14 or laptop 16) utilized by the customer 12 for the customer communication, and the highest security level category may relate to data such as a social security number, or a customer account number and/or PIN or password. Intermediate security level categories may include data such as historical information relating to the home address, business address, or family members of the customer 12, or data obtained via preliminary security questions answered by the customer 12 prior to the customer communication (e.g., when the customer 12 opens the account with the business). Artificial intelligence and machine learning may be employed to set security levels based on historical data.

In one embodiment, final authentication of the customer 12 may require, for example, that the customer 12 successfully passes a certain number of security challenges at a threshold security level category, that the customer 12 successfully passes at least one security challenge having a security level category above the aforementioned threshold security level category, or a combination thereof. By employing the above-described techniques, the communication system 10 is capable of credibly and efficiently authenticating the customer 12 or the customer communication thereof.

Figure 2:
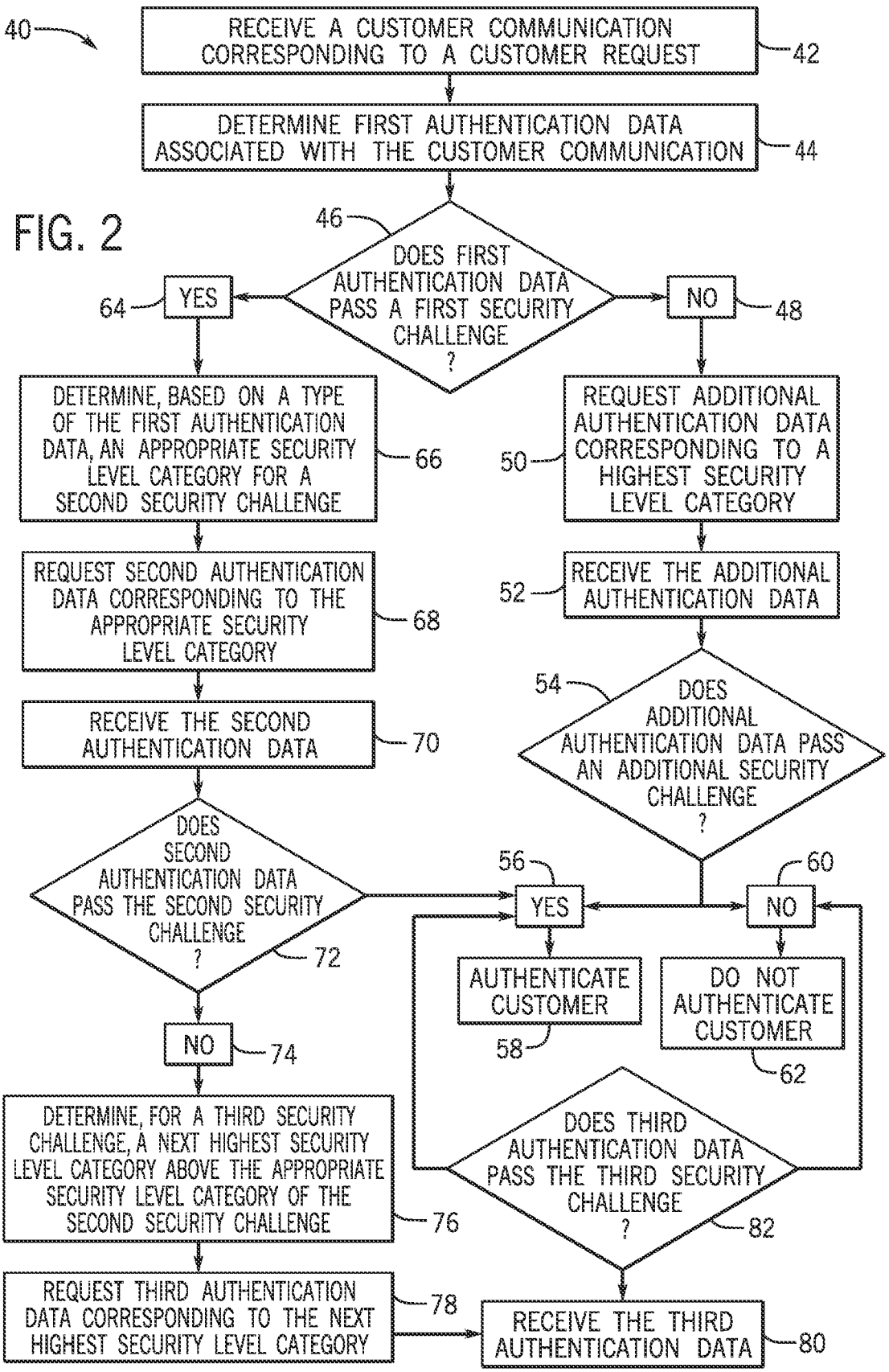
FIG. 2 is a process flow diagram illustrating a method of operating the communication system of FIG. 1 to authenticate a customer or customer communication, in accordance with embodiments described herein.

FIG. 2 is a process flow diagram illustrating an embodiment of a method 40 of operating the communication system of FIG. 1 to authenticate a customer or customer communication. In the illustrated embodiment, the method 40 includes receiving (block 42), at a phone/computer system, a customer communication corresponding to a customer request, and determining (block 44) first authentication data associated with the customer communication. In some embodiments, the first authentication data may be automatically determined without customer input. For example, the first authentication data may include a telephone number, an IP address, or a location of the device from which the customer communication is received. In other embodiments, at least some of the first authentication data may be provided by the customer in response to a query, for example via text-based or auditory entry.

The method 40 also includes determining (block 46), via a server, whether the first authentication data passes a first security challenge. For example, the first authentication data may be a phone number of the device from which the customer communication is received. The server may receive customer-specific data, such as a registered phone number or list of registered phone numbers of the customer, included in a customer account stored to a database of the communication system. The first authentication data may be compared to the customer-specific data stored in the customer account on the database. If the first authentication data does not pass the first security challenge (block 48), then the method 40 may include requesting (block 50), via the phone/computer system, additional authentication data corresponding to a highest security level category. As previously described, certain types of authentication may be considered more credible than certain other types of authentication. Thus, the server may include, stored in a memory thereof (or in a separate database), data indicative of various security level categories ranging from a least credible (lowest level) to a most credible (highest level). As noted above with respect to blocks 46, 48, and 50, if the first security challenge is failed, then the phone/computer system may request additional authentication data corresponding to the most credible (highest) security level category, for example a social security number. The method 40 then includes receiving (block 52) the additional authentication data from the customer and determining (block 54) whether the additional authentication data passes the additional security challenge. If the additional security challenge is passed (block 56), then the system may authenticate (block 58) the customer. If the additional security challenge is failed (block 60), then the system may not authenticate (block 62) the customer.

Returning to block 46, if the first authentication data passes the first security challenge (block 64), then the server may determine (block 66), based on a type of the first authentication data (and/or corresponding first security challenge) and/or other factors, an appropriate security level category for a second security challenge. For example, the first security challenge may correspond to a particular security level category, and the appropriate security level category for the second security challenge may depend on the particular security level category corresponding to the first security challenge (and/or the first authentication data thereof). Indeed, the appropriate security level category of the second security challenge may be higher if the security level category corresponding to the first security is relatively low (e.g., less credible) than if it is relatively high (e.g., more credible). In one embodiment, verifying a phone number in the authentication process may be deemed more credible than authenticating an IP address in the authentication process. That is, the security level category including phone numbers may be higher than the security level category including IP addresses. Accordingly, if the customer's phone number is verified via the first security challenge, then the appropriate security level category for the second security challenge may be lower than it would be if only the customer's IP address is verified.

Further, the first security challenge may involve checking two or more pieces of data, such as the above-described phone number and IP address of the device from which the customer communication is received. If the phone number matches the registered phone number in the customer account, but the IP address does not match a registered IP address in the customer account, the system may determine that the first security challenge is passed to a first degree. Additionally, if the phone number matches the registered phone number and the IP address matches the registered IP address, the system may determine that the first security challenge is passed to a second degree. For the appropriate security level category of the second security challenge, the system may require a more credible (i.e., higher) security level category for the first degree of passing the first security challenge than for the second degree of passing the first security challenge. Both of the above-described factors (e.g., the security level category of each piece of data, and whether multiple pieces of data or only a single piece of data are verified) may be considered in determining the appropriate security level category of the second security challenge. As an example, for the first degree of passing the first security challenge, the second security challenge may include a relatively high security level category (e.g., inputting a birthdate of a first born child of the customer), and for the second degree of passing the first security challenge, the second security challenge may include a relatively low security level category (e.g., inputting a name of any child of the customer).

After determining the appropriate security level category for the second security challenge, the method 40 includes requesting (block 68) and receiving (block 70) second authentication data corresponding to the appropriate security level category. Further, the method 40 includes determining (block 72) whether the second authentication data passes the second security challenge. As previously described with respect to the first security challenge, the authentication data may be compared to customer-specific data included in a customer account stored to a database. The server may receive the customer-specific data and compare the second authentication data with the customer-specific data. If a match is detected (block 56), then the system may authenticate (block 58) the customer. In another embodiment, another security challenge may be deployed even if the second security challenge is passed.

If the second security challenge is not passed (block 74), then the system (e.g., the server) may determine (block 76), for a third security challenge, a next highest security level category above the appropriate security level category of the second security challenge. For example, if the second security challenge involves a third security level category and the second security challenge is failed, then the third security challenge may involve a fourth security level category above the third security level category (e.g., a more credible authentication level). Further, the method 40 includes requesting (block 78) and receiving (block 80) third authentication data from the customer corresponding to the next highest security level category determined at block 76. The method 40 includes determining (block 82) whether the third authentication data passes the third security challenge. If the third authentication data passes (block 56) the third security challenge, then the customer is authenticated (block 58). If the third authentication data does not pass (block 60) the third security challenge, then the customer is not authenticated (block 62). However, in some embodiments, the method 40 may include, in response to failing the third security challenge, a fourth security challenge having a security level category higher than that of the third security challenge, and so on and so forth. In some embodiments, if a certain number of total or consecutive security challenges is failed (e.g., two failed challenges, three failed challenges, four failed challenges, etc.), the method 200 may include requiring that the customer pass a security challenge corresponding to the highest security level category. For example, the system may include a threshold amount of failed total or consecutive challenges, such as three challenges, that, when exceeded, causes the system to require passing a security challenge corresponding to the highest security level category.

Figure 3:
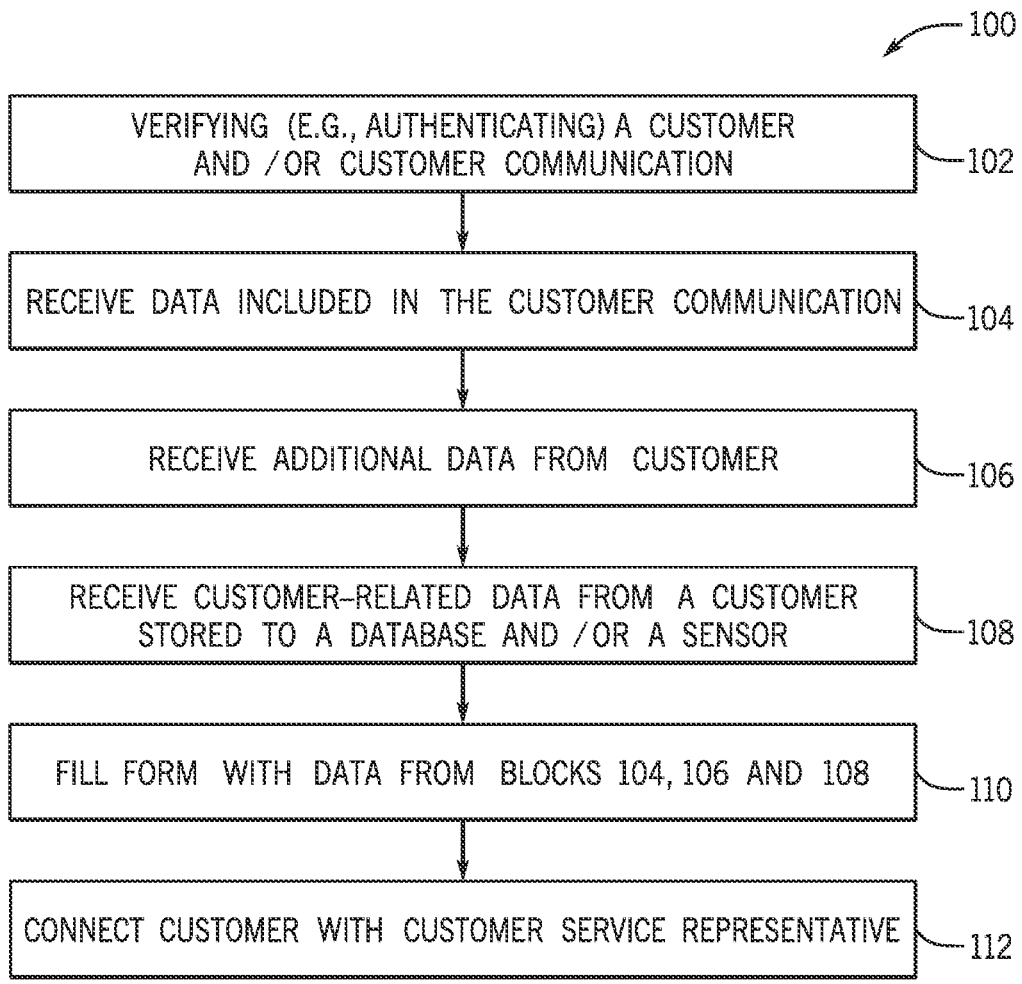
FIG. 3 illustrates a form filling technique of the communication system of FIG. 1, in accordance with embodiments described herein.

FIG. 3 illustrates an embodiment of a form filling technique or method 100 of the communication system of FIG. 1. In the illustrated embodiment, the method 100 includes verifying (e.g., authenticating) (block 102) a customer and/or customer communication corresponding to a customer request. For example, the method 40 of FIG. 2 may be employed at block 102. Other verification techniques are also possible.

The method 100 also includes receiving (block 104) data included in the customer communication. For example, the initial customer communication may include certain data available without customer input, such as a phone number, a location, an IP address of the device from which the customer communication is received, or a reason (e.g., customer request) corresponding to the customer communication. In one embodiment, for example, the customer may request help regarding whether a payment is due, whether a product or service is available, problems with products or services purchased by the customer, and other data.

The method 100 also includes receiving (block 106) additional data provided by the customer. That is, the method 100 may include receiving additional data or information subsequent to the initial customer communication. For example, the customer may be prompted (e.g., via an automated aspect of a phone/computer system) to provide a reason for the customer communication. As noted above, the reason for the customer communication may be provided as a part of the initial customer communication. Other data may also be provided subsequent to the initial customer communication.

The method 100 also includes receiving (block 108) customer-related data from a customer account stored to a database and/or from a sensor (e.g., sensor 29 in FIG. 1). For example, the customer-related data may include products or services already purchased by the customer, products or services suitable for the customer, authentication and verification data, customer identification data (e.g., name, birthdate, family members, income, etc.), and other data. In on embodiment, block 108 may include receiving data related to the reason for the customer communication. For example, the customer communication may include a request for assistance regarding an insurance policy for a home. Block 108 may include obtaining from the customer account stored to the database a square footage of the home, a risk assessment of the home, an age of the home, or other aspects. Block 108 may additionally or alternatively include scraping publicly available data (e.g., social media account, a property tax or real estate website such as Zillow). Block 108 may additionally or alternatively include receiving sensor feedback from a sensor associated with the customer and/or the customer communication. For example, the system may determine at block 108 that the customer communication relates to a request for utilities (e.g., water) assistance. The system may determine, based on sensor feedback from a sensor (e.g., sensor 29 in FIG. 1), that a water leak was detected at the customer's residence.

The method 100 also includes filling (block 110) a form with data from blocks 104, 106, and 108. The form may be filled with data that is obtained prior to any person-to-person interfacing between the customer and the business (e.g., a customer service representative). That is, in some embodiments, the blocks 104, 106, 108 may include receiving data without initiating a phone call between the customer and a customer service representative. For example, block 104 may include acquiring publicly or internally (internal to the system performing the method) available information about the customer, such as via accessing a personal profile. As another example, block 106 may include prompting the customer to provide information via an app or text message. In other embodiments, at least certain of the data referenced in blocks 104, 106, and 108 may be obtained by a customer service representative.

The method 100 also includes connecting (block 112) the customer with the customer service representative. For example, the customer communication may involve a web-based chat, a phone call, a text message, or the like. At some point during the method 100, for example after the above-described form is filled, a customer service representative may be paired with the customer. In some embodiments, the customer service representative is selected based on the data filled into the form. For example, various customer services representatives may be categorized by type (e.g., service type, product type, etc.), and the appropriate type of customer service representative may be selected based on the pre-filled form and corresponding data.

Figure 4:
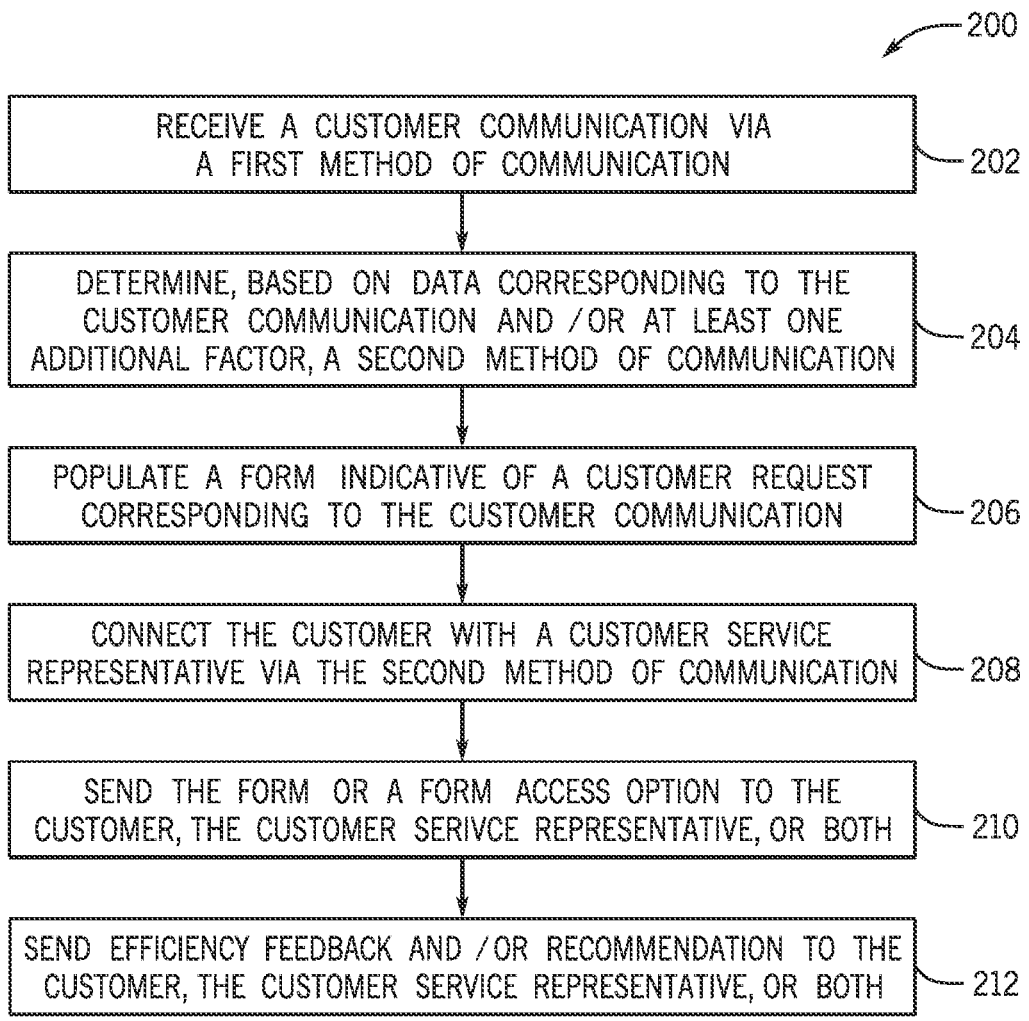
FIG. 4 illustrates a communication cross-over technique of the communication system of FIG. 1, in accordance with embodiments described herein.

In some embodiments, both text-based chat and telephone customer service assistance may be available. In certain circumstances, text-based chat may be an ideal avenue for assisting the customer. In certain other circumstances, telephone customer service may be an ideal avenue for assisting the customer. In accordance with the present disclosure, a communication cross-over technique may be employed as a part of the methods 40, 100 illustrated in FIGS. 2 and 3, or separately therefrom. FIG. 4, described in detail below, illustrates an embodiment of a communication cross-over technique or method 200 of the communication system of FIG. 1.

Turning to FIG. 4, in the illustrated embodiment, the method 200 includes receiving (block 202) a customer communication via a first method of communication. For example, the customer communication may be a phone call, a text message, a web-based communication, or some other form of communication.

The method 200 also includes determining (block 204), based on data corresponding to the customer communication and/or at least one additional factor, a second method of communication. For example, the customer communication may include data indicating a type of request made by the customer along with other information, such as a phone number of the customer and/or of the device communicating the customer communication, a location of the device, an IP address of the device, and other data. Additional information may be provided after the customer communication, and the additional information may also be analyzed when determining the second method of communication. In one embodiment, the first method of communication may be an email request. However, the type of request may be more suitable for handling via phone call. For example, the type of request may relate to changing an insurance policy, where changing the insurance policy is more easily handled via phone call. Indeed, the request to change the insurance policy may require human-to-human authorization. In another embodiment, the first method of communication may be a phone call. However, the type of request may be more suitable for handling via email or some other web-based chat feature. For example, the type of request may relate to a request for information regarding a size of an insurance policy. Indeed, the request for information may be such that voice-based assistance (e.g., via a customer service representative) is extraneous, not needed, or otherwise a relative waste of resources.

The method 200 also includes populating (block 206) a form indicative of a customer request corresponding to the customer communication. For example, block 206 may include all or part of the method 100 illustrated in FIG. 3 and described with respect to FIG. 3 above. The method 200 also includes connecting (block 208) the customer with a customer service representative via the second method of communication. Further, the method 200 includes sending (block 210) the form or a form access option to the customer, the customer service representative, or both. For example, as previously described, the method 200 may include determining an ideal or desirable method of communication, and initiating said method of communication. The ideal or desirable method of communication may differ from the customer's original method of communication. Because the above-described form may be filled at least in part based on the customer communication corresponding to the first method of communication, the method 200 includes availing the customer and/or the customer service representative with the form or a form access option. For example, the form may be stored to a server or database and a form-specific password may be generated and linked with the form. The form-specific password may be communicated to the customer, the customer service representative, or both such that the customer, the customer service representative, or both can access the form when the second method of communication is initiated.

The method 200 also includes sending (block 212) efficiency feedback and/or an efficiency recommendation to the customer, the customer service representative, or both. For example, the method 200 may include providing feedback to the customer indicating that for the type of customer communication received, the second method of communication is generally more efficient, faster, more accurate, or enables some other benefit. The method 100 may also include providing feedback to the customer service representative indicating, for example, that the customer service representative failed to identify a particular portion of the above-described form, the particular portion including information that would have resolved the customer request more quickly.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. One or more non-transitory, computer readable media including instructions stored thereon that, when executed by processing circuitry, are configured to cause the processing circuitry to:
   receive, from a customer interface device (CID) of a customer, without presenting an authentication query to the CID, and without receiving an authentication query response from the CID, a customer communication indicative of a request for assistance;
   extract, from the customer communication, first authentication data corresponding to the customer;
   determine, based on the first authentication data, a customer account of a plurality of customer accounts stored to a database;
   receive, from the database, first registered data corresponding to the customer account;
   determine, based on a first comparison between the first authentication data and the first registered data, a first outcome of a first security challenge;
   determine, from a plurality of security level categories, a first security level category associated with the first security challenge;
   select, from the plurality of security level categories and in response to the first outcome of the first security challenge corresponding to a passing of the first security challenge, a second security level category for a second security challenge and corresponding to a lower security level category than the first security level category;
   receive, from the database, second registered data corresponding to the customer account and the second security challenge;
   receive, from the CID, a customer input having second authentication data; and
   determine, based on a second comparison between the second registered data and the second authentication data, a second outcome of the second security challenge.

2. The one or more non-transitory, computer readable media of claim 1, wherein the instructions, when executed by the processing circuitry, are configured to cause the processing circuitry to determine, from the plurality of security level categories, based on the second security level category, and based on the second outcome of the second security challenge, a third security level category associated with a third security challenge.

3. The one or more non-transitory, computer readable media of claim 2, wherein the instructions, when executed by the processing circuitry, are configured to cause the processing circuitry to select, as the third security level category and in response to determining that the second outcome of the second security challenge corresponds to a failure of the second security challenge, a highest security level category of the plurality of security level categories.

4. The one or more non-transitory, computer readable media of claim 1, wherein the instructions, when executed by the processing circuitry, are configured to cause the processing circuitry to:
   confirm, in response to determining that the second outcome of the second security challenge corresponds to an additional passing of the second security challenge, authentication of the CID or the customer corresponding to the CID.

5. The one or more non-transitory, computer readable media of claim 1, wherein the instructions, when executed by the processing circuitry, are configured to cause the processing circuitry to:
   generate, based on the customer communication, a pre-filled form having form data related to the request for assistance;
   transmit the pre-filled form to a customer service representative device; and
   establish a customer service connection between the customer service representative device and the CID.

6. The one or more non-transitory, computer readable media of claim 1, wherein the first authentication data includes a phone number, an IP address, or a location.

7. The one or more non-transitory, computer readable media of claim 1, wherein the first authentication data includes at least two of a phone number, an IP address, or a location.

8. The one or more non-transitory, computer readable media of claim 1, wherein the first authentication data includes a phone number, an IP address, and a location.

9. A system, comprising:
   a database storing customer account data indicative of a plurality of customer accounts; and
   processing circuitry configured to:
      receive, from a customer interface device (CID) of a customer, without presenting an authentication query to the CID, and without receiving an authentication query response from the CID, a customer communication indicating a request for assistance;
      extract, from the customer communication, first authentication data corresponding to the customer;
      determine, based on the first authentication data, a customer account of the plurality of customer accounts;
      receive, from the database, first registered data corresponding to the customer account;
      determine, based on a first comparison between the first authentication data and the first registered data, a first outcome of a first security challenge;
      determine, from a plurality of security level categories, a first security level category associated with the first security challenge;
      select, from the plurality of security level categories and in response to the first outcome of the first security challenge corresponding to a passing of the first security challenge, a second security level category for a second security challenge and corresponding to a lower security level category than the first security level category;
      receive, from the database, second registered data corresponding to the customer account and the second security challenge;
      receive, from the CID, a customer input having second authentication data; and determine, based on a second comparison between the second registered data and the second authentication data, a second outcome of the second security challenge.

10. The system of claim 9, wherein the processing circuitry is configured to confirm, in response to the second outcome of the second security challenge corresponding to an additional passing of the second security challenge, authentication of the CID or a customer associated with the CID.

11. The system of claim 9, wherein the processing circuitry is configured to select, from the plurality of security level categories and in response to the first outcome of the first security challenge corresponding to a failure of the first security challenge, the second security level category for the second security challenge and corresponding to a higher security level category than the first security level category.

12. The system of claim 9, wherein the processing circuitry is configured to decline, in response to the second outcome of the second security challenge corresponding to a failure of the second security challenge, authentication of the CID or a customer associated with the CID.

13. The system of claim 9, processing circuitry configured to:
generate, based on the customer communication, a pre-filled form having form data related to the request for assistance;
transmit the pre-filled form to a customer service representative device; and
establish a customer service connection between the customer service representative device and the CID.

14. A computer-implemented method, comprising:
receiving, via processing circuitry, from a customer interface device (CID) of a customer, without presenting an authentication query to the CID, and without receiving an authentication query response from the CID, a customer communication indicating a request for assistance;
extracting, via the processing circuitry and from the customer communication, first authentication data corresponding to the customer;
searching, via the processing circuitry and based on the firsts authentication data, a database storing a plurality of customer accounts thereon to determine a customer account corresponding to the customer;
receiving, at the processing circuitry and from the database, first registered data corresponding to the customer account;
determining, via the processing circuitry and based on a first comparison between the first authentication data and the first registered data, a first outcome of a first security challenge;
determine, via the processing circuitry and from a plurality of security level categories, a first security level category associated with the first security challenge;
selecting, via the processing circuitry, from the plurality of security level categories, and in response to the first outcome corresponding to a passing of the first security challenge, a second security level category for a second security challenge and corresponding to a lower security level category than the first security level category;
receiving, via the processing circuitry and from the database, second registered data corresponding to the customer account and the second security challenge;
receiving, via the processing circuitry and from the CID, a customer input having second authentication data; and
determining, based on a second comparison between the second registered data and the second authentication data, a second outcome of the second security challenge.

15. The computer-implemented method of claim 14, comprising confirming, in response to the second outcome of the second security challenge corresponding to an additional passing of the second security challenge, authentication of the CID or the customer associated with the CID.

16. The computer-implemented method of claim 14, comprising:
generating, via the processing circuitry and based on the customer communication, a pre-filled form having form data related to the request for assistance;
transmitting, via the processing circuitry, the pre-filled form to a customer service representative device; and
establishing, via the processing circuitry, a customer service connection between the customer service representative device and the CID.

17. The computer-implemented method of claim 16, wherein the customer service connection includes a phone call, a web-based chat, or a text message.

* * * * *